April 14, 1970     E. H. JOHNSON     3,506,228
APPLIANCE FOR LINEAR BODIES
Filed Dec. 22, 1967     2 Sheets-Sheet 1

Inventor
Ernest H. Johnson
By Hume, Clement, Hume & Lee
Attorneys

April 14, 1970     E. H. JOHNSON     3,506,228

APPLIANCE FOR LINEAR BODIES

Filed Dec. 22, 1967     2 Sheets-Sheet 2

Inventor
Ernest H. Johnson
By Hume, Clement, Hume & Lee
Attorneys

United States Patent Office 3,506,228
Patented Apr. 14, 1970

1

3,506,228
APPLIANCE FOR LINEAR BODIES
Ernest H. Johnson, Parma, Ohio, assignor to Preformed Line Products Company, Cleveland, Ohio, a corporation of Ohio
Filed Dec. 22, 1967, Ser. No. 693,009
Int. Cl. F16l 3/10
U.S. Cl. 248—63                                       13 Claims

ABSTRACT OF THE DISCLOSURE

The disclosed cable support assembly includes three basic components, namely, a generally U-shaped clamping element and suspension of linear bodies, such as electrical cable gripping elements are received intermediate the leg portions of the clamping member in opposed facing relation with their respective lower end portions positively indexing or interlocking within the base of the clamping member and their upper end portions overlying respective interior faces of the leg portions of the U-shaped member. The gripping elements are adapted to firmly hold a cable extending between their opposed faces when the leg portions of the clamping element and the upper end portions of the gripping elements are drawn together in a clamping relation. Preferably, the gripping elements do not directly contact the cable but rather exercise their gripping action through a protective covering, as a rubber-like cushion surrounding the cable. Other features are disclosed.

INTRODUCTION

The present invention relates generally to the reinforcement and suspension of linear bodies, such as electrical transmission lines or cables and, more specifically, to a new and improved cable support assembly.

SUMMARY OF THE INVENTION

It is a primary object of the present invention to provide a new and improved cable support assembly.

It is another object of the present invention to provide a cable support assembly featuring positive indexing or interlocking of the components thereby greatly facilitating the lineman's task of installing the assembly while atop a line pole or the like.

It is another object of the invention to provide such an assembly which is readily tightened to apply a firm gripping force to a cable or the like and not thereafter subject to slippage or shifting of the components causing the clamp to loosen its hold on the cable.

It is a further object of the invention to provide a support assembly of comparatively light weight but exceptional strength.

It is yet another object of the invention to provide such an assembly which is economical of construction by virtue of broad structural tolerances and identity between certain assembly components.

Accordingly, the present invention is directed to a support assembly for electrical transmission cables or the like comprising a generally U-shaped clamping element having opposed leg portions and a return bent intermediate portion, the leg portions being adapted to be drawn toward one another in a clamping relation. There are also provided a pair of cable gripping elements structurally adapted for positive indexing with the return bent portion of the clamping element when received in opposed facing relation intermediate the leg portions and further having respective upper end portions adapted to be drawn together under the clamping action of the return bent leg portions whereby the cable is firmly retained intermediate the gripping elements.

2

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

DESCRIPTION OF THE PREFERRED EMBODIMENTS

Figure 1:
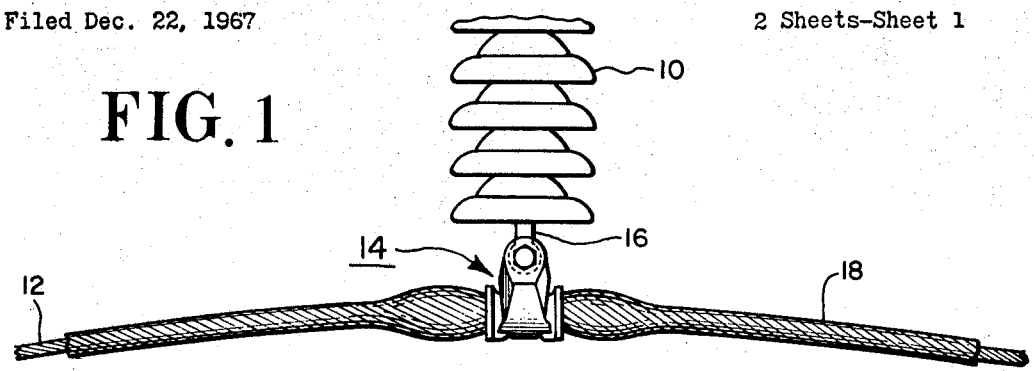
FIGURE 1 is a fragmentary side elevational view showing an electrical cable suspended from a ceramic insulator by a cable support assembly according to the present invention.

Referring to FIGURE 1, there is shown a glass or ceramic insulator 10 of a type conventionally employed in the mounting of an electrical transmission line or cable 12 from the crossbar of a line pole or other support tower (not shown). The cable 12 is suspended from the base of the insulative pillar 10 by a cable support assembly 14 of the present invention. As shown, the assembly 14 includes a lower section which encompasses the transmission cable 12 and an upper section which is retained in a bolted or clamped relation with a depending arm 16 of the insulator 10.

Preferably, the support assembly 14 does not directly grasp or contact the cable 12 but rather effects the gripping thereof through a mechanically protective covering for the cable. Specifically, this protective covering includes a series of preformed helical armor rods 18 which are interwound about the cable 12 and, in the region of the support assembly 14 also overlie a cushion means for the cable, as evidenced by the bulge in the armor rods adjacent the support clamp.

Figure 2:
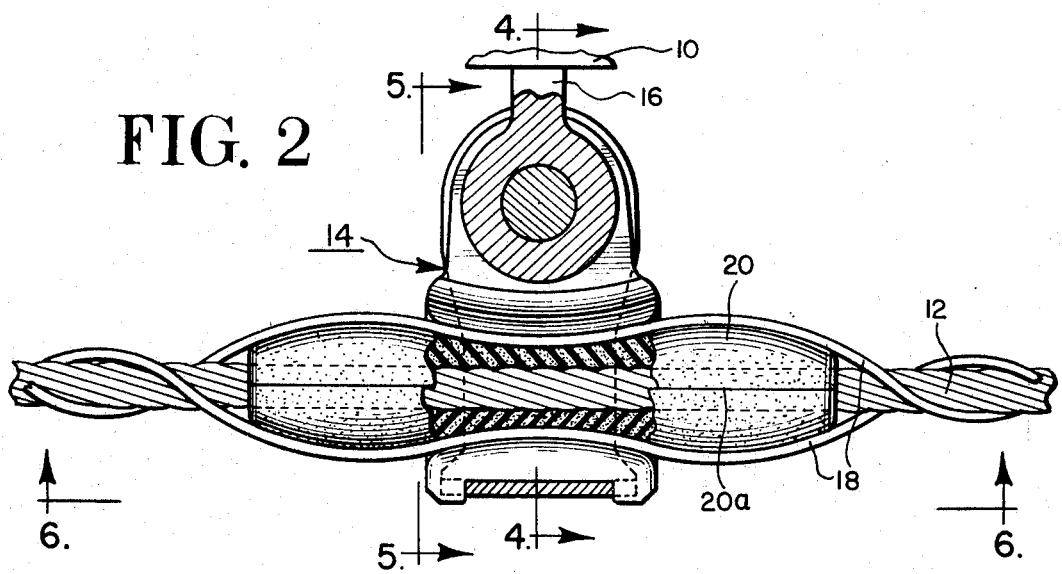
FIGURE 2 is a side view, partly in section, of the cable assembly as installed with parts of the protective covering for the cable omitted to more clearly illustrate certain structural features of the covering.

The preferred manner of preparing the cable 12 prior to installation of the support assembly 14 can best be understood by reference to FIGURE 2. In this view, all but two strands of the preformed helical rods 18 have been omitted to more clearly illustrate an underlying cushion means 20. The cushion 20 is of a rubber-like composition, such as neoprene, and is of an annular cross-section with a centrally disposed bore for passing the cable 12. The cushion 20 is slit along its longitudinal extent as at 20a to permit it to be applied about the cable 12. Alternatively, the cushion 20 may be completely severed along a horizontal plane through line 20a to provide two half-sections which are taped together or the like after application to the cable to temporarily hold the half-section in place until the helical members 18 are applied thereabout.

To prevent longitudinal shifting of the cable support assembly 14 relative to the cable, the cushion 20 of the present embodiment is of a saddle-shaped contour along its longitudinal profile, that is, the cushion is narrower in cross-section at its center than at its opposite ends. As will be explained in greater detail later herein, the gripping surfaces of the cable support assembly are of a contour to conform to that of the cushion. Also, the helical rods 18 preferably are carefully applied so as to only extend axially along the length of the cushion, i.e. not to encircle the cushion, and to conform to the saddle-shaped contour thereof. Beyond the end of the cushion 20, the members 18 are permitted to assume their normal helical pitch and to encompass the cable 12 in conventional fashion. The preformed helical members 18 are familiar to the art and their construction need not be considered in detail herein. Further types of cushion and preformed helical rod arrangements are disclosed and claimed in Peterson Patent 2,722,393 assigned to the same assignee as the present invention. Certain of the arrangements disclosed in the aforesaid patent are also suitable for use in conjunction with the cable support clamp of the present invention, although the illustrated arrangement is preferred.

Figure 3:
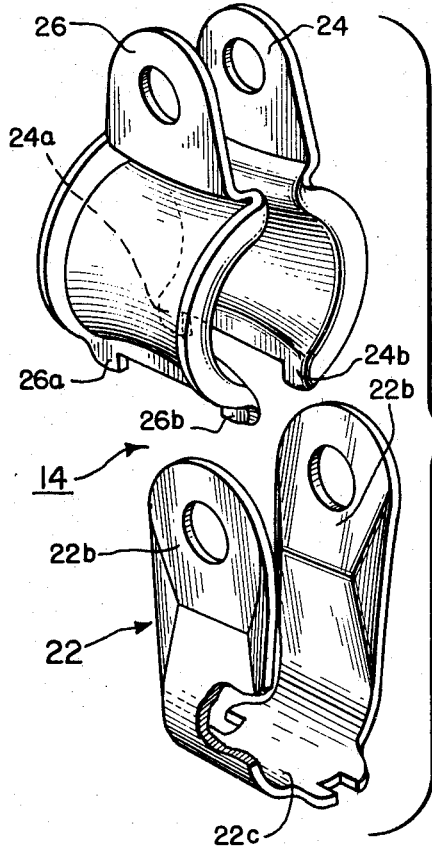
FIGURE 3 is a perspective view illustrating the three basic components of the present invention and the manner of their assembly.

Referring now to FIGURE 3, the basic components and initial mode of assembly of the cable support arrangement 14 may be appreciated in greater detail. Specifically, the assembly 14 comprises a generally U-shaped clamping element 22 having opposed leg portions 22a and 22b and also a return bent intermediate portion 22c. The opposed legs 22a and 22b are provided with axially aligned apertures adjacent their respective upper end portions for receiving a bolt or similar retaining means whereby the legs are drawn together in a clamping relation.

The assembly 14 also includes a pair of cable gripping elements 24 and 26, preferably of the illustrated identical construction for economy of manufacture and to simplify assembly even under adverse working conditions. Further to this objective, the lower end portions of the gripping elements 24 and 26 are adapted for positively indexing with the return bent portion 22c of the clamp 22 so that the workman is not called upon to make delicate adjustments in effecting assembly nor, for that matter, will the components lose their proper alignment despite substantial jostling.

More particularly, the positive indexing of the several parts is effected by a key and slot arrangement formed between the lower end portions of the respective gripping elements and the return bent portion 22c of the clamping element. In the illustrated construction, recessed slots are provided in opposed alignment on opposite longitudinal sides of the return bent portion 22c. The keys are defined by depending tabs 24a and 24b of the element 24 and tabs 26a and 26b of the element 26. The spacing between the interior edges of the tabs on each element is somewhat greater than the transverse dimension between the slots of the return bent portion 22c to permit a free lateral indexing of the tabs in the slots as is illustrated more clearly in FIGURES 6 and 7. Similarly, the longitudinal dimension of each slot sufficiently exceeds the combined thickness of the tabs 24a and 26a and the tabs 24b and 26b, respectively, to permit a free longitudinal indexing of the tabs in their respective slots. Thus, the assembly allows of comparatively broad structural tolerances, an obviously desirable feature for ease of assembly and economy of manufacture. However, it should be understood that the relative dimensions of the key and slot arrangement should not be such that the positive indexing feature is substantially impaired or lost. In this regard, dimensions of the character illustrated in the several drawings herein are preferred to obtain both the objectives of economy and a positive indexing feature.

The opposed surfaces of the lower end portions of the gripping elements 24 and 26 are curved or arcuately contoured to conform to the outline of the saddle-shaped cushion 20 as previously discussed. The upper portion of both gripping elements are of a flat planar contour for mating with the like planar surface portions of the legs 22a and 22b of the clamping element. The identical gripping elements 24 and 26 also include apertures in their respective upper end portions adapted to align with the apertures of the leg portions when the gripping elements are lowered to their positive indexing positions in the base of the U-shaped clamping element.

Figure 4:
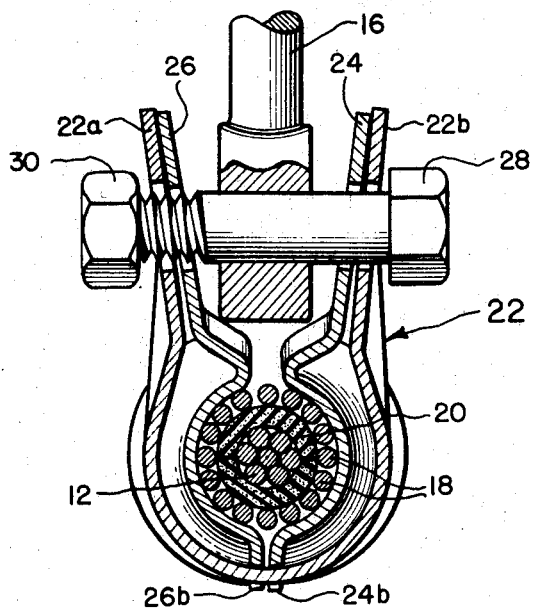
FIGURE 4 is a sectional view taken along lines 4—4 of FIGURE 2, but with the support assembly in an unclamped condition.
Figure 5:
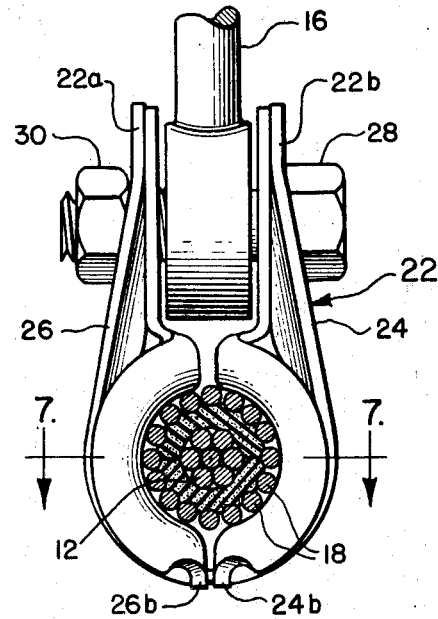
FIGURE 5 is a side elevational view taken along lines 5—5 of FIGURE 2 and illustrating the support assembly in a clamped condition.

The manner of installing the clamp assembly and the positional interrelationships of all of the components may best be appreciated by reference to FIGURES 4 and 5. In FIGURE 4, the gripping elements 24 and 26 are shown as normally seated in opposed facing relation intermediate the legs 22a and 22b of the U-shaped clamping element and with their respective keys indexed in the slotted base of the clamping element. The apertures in the respective elements are in their properly aligned relationships; these apertures have also been aligned with the central bore of the depending arm 16 of the insulator and retaining means in the form of a conventional bolt 28 and nut 30 have been loosely journaled through the apertures with the arm 16 being interposed between the gripping elements 24 and 26. From this view, it may also be appreciated that although the lower end portions of the respective gripping elements almost totally encircle and conform to the circular outline of the protectively covered cable 12, the upper portions of the gripping elements are flared outwardly to assure that planar faces of the gripping elements closely overlie the similarly contoured interior faces of the legs 22a and 22b of the U-shaped clamping element.

Referring now to FIGURE 5, the bolt 28 and nut 30 have been tightened to draw all of the elements together in an intimate clamping relation and thereby complete installation of the assembly. The diameter of the region enclosed by the clamped gripping elements is somewhat smaller than the normal outer diameter of the protective covering of the cable to assure that sufficient gripping forces are applied to the covered cable. The clamping action of the nut and bolt thus develops a very substantial reaction force between the ends of each slot in the base of the clamp and the keys of the gripping elements. The protectively covered cable 12 is very firmly retained by the gripping elements with the resilient neoprene cushion 20 absorbing a portion of the compressive forces thereby avoiding injury to the cable.

Figure 6:
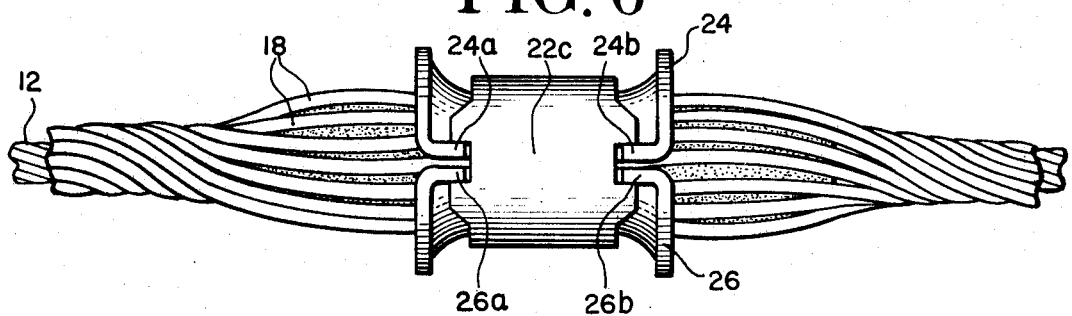
FIGURE 6 is a bottom perspective view of the support assembly taken along lines 6—6 of FIGURE 2.
Figure 7:
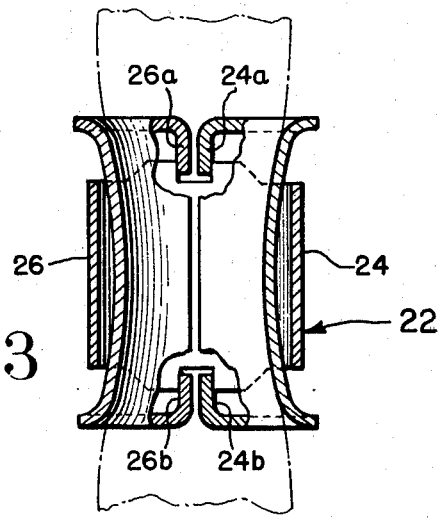
FIGURE 7 is a sectional view taken along lines 7—7 of FIGURE 5.

The positioning of the keys of the gripping elements in firm enagement with the transverse edges of the slots in the base 22c of the clamping element is shown in FIGURE 6. The relative size relationships of the keys and slots are also clearly depicted in this figure. Furthermore, all of the helical members 18 are illustrated in properly encompassing relation about the cable and cushion means. As previously stated, the helical members 18 are applied so as to only extend axially along the cushion with their normal helical pitch being resumed only beyond the extreme limits of the cushion. Turning now to FIGURE 7, it will be observed that the lower portions of the legs of the clamping element 22 do not engage the gripping elements 24 and 26 and such contact is not necessary. This is because the retaining force on the protectively covered cable 12 is developed entirely by the clamping action of the bolt 28 and nut 30 in conjunction with the positive indexing or interlocking of the gripping elements in the base of the clamping element. Once assembled with the bolt 28 extending through the aligned apertures of the various components, the elements 22, 24 and 26 are so interlocked that relative movement therebetween which would tend to lessen the gripping force on the cable can not occur.

While particular embodiments of the present invention have been shown and described, it is apparent that various changes and modifications may be made, and it is therefore intended in the following claims to cover all such modifications and changes as may fall within the true spirit and scope of this invention.

What I claim is:

1. A support assembly for an electrical transmission cable or the like comprising:
   a generally U-shaped clamping element having opposed leg portions and a return bent intermediate portion, said leg portions adapted to be drawn toward one another in clamping relation;
   and a pair of cable gripping elements having respective lower end portions adapted for positively indexing with said return bent portion of said clamping element when received intermediate said leg portions in opposed facing relation, intermediate portions of a contour for conforming to said cable and having respective upper end portions lying intermediate said leg portions and adapted to be drawn together under the clamping action of said leg portions whereby said cable is firmly retained intermediate said pair of gripping elements.

2. The assembly of claim 1 in which the opposed facing surfaces of said lower end portions of said gripping elements are of a curved contour.

3. The assembly of claim 2 in which said lower end portions of said gripping elements and said return bent portion of said clamping elements include key and slot means for effecting said positive indexing.

4. The assembly of claim 3 and further including elongated cushion means of annular cross-section adapted to surround said cable in interposition between said cable and said gripping elements.

5. The invention of claim 4 wherein said cable support assembly is adapted to be suspended from a depending support arm of a line pole or the like and further including:
   retaining means adapted for maintaining said return bent leg portions of said clamping element, said upper end portions of said gripping elements and said support arm in a tightly clamped relation, said support arm being interposed between said upper end portions of said gripping elements whereby said cable is securely suspended from said linepole.

6. The assembly of claim 5 in which said return bent portion of said clamping element is formed to define recessed slots along opposite sides thereof and further in which said lower end portions of said gripping elements are each formed to define a pair of keys adapted to be received in respective ones of said slots.

7. The assembly of claim 6 in which said upper portions of said gripping elements and said opposed leg portions of said clamping element are of a mating planar contour to assure an intimate and reliable clamping therebetween.

8. The assembly of claim 7 in which the longitudinal extent of said recessed slots in said return bent portion of said clamping element is equal and only slightly greater than the combined thickness of the keys of said gripping elements adapted to be seated in the respective slots.

9. The assembly of claim 8 in which said pair of cable gripping elements are of substantially identical construction.

10. The assembly of claim 9 in which said cushion means is of a saddle-shaped contour along its longitudinal extent and in which said opposed facing surfaces of said gripping elements are of a generally conforming contour.

11. The assembly of claim 10 and further including:
    a plurality of preformed helical elements adapted to overlie said cushion means and to extend beyond the longitudinal extent of said cushion means in encircling relation with said cable for securely retaining said cushion means in engagement with said cable.

12. The assembly of claim 11 in which said helical elements are adapted to extend substantially axially along said cushion means in close conformity to said saddle-shaped contour of said cushion means.

13. The assembly of claim 12 in which said upper end portions of said gripping elements and said leg portions of said clamping elements are all formed to define axially aligned apertures and in which said retaining means consists essentially of a bolt assembly adapted for extending through all of said apertures to effect said intimate clamping of all of said elements and said support arm.

References Cited

UNITED STATES PATENTS

| 1,129,782 | 2/1915 | Bissell | 248—74 X |
| 2,872,141 | 2/1959 | Hefner | 248—62 |
| 2,722,393 | 11/1955 | Peterson | 248—63 |
| 3,054,587 | 9/1962 | Hebenstreit | 248—74 |

FOREIGN PATENTS 882,653  11/1961  Great Britain.

CHANCELLOR E. HARRIS, Primary Examiner

U.S. Cl. X.R.

174—42

PO-1050
(5/69)

UNITED STATES PATENT OFFICE
CERTIFICATE OF CORRECTION

Patent No. 3,506,228          Dated April 14, 1970

Inventor(s) Ernest H. Johnson

It is certified that error appears in the above-identified patent and that said Letters Patent are hereby corrected as shown below:

Column 1, line 3, delete after the word "and" --

"suspension of linear bodies, such as electrical"

Column 1, line 3, add after the word "and" --

"a pair of similar cable gripping elements. The"

SIGNED AND
SEALED
SEP 15 1970

(SEAL)
Attest:

Edward M. Fletcher, Jr.
Attesting Officer

WILLIAM E. SCHUYLER, JR.
Commissioner of Patents